(12) United States Patent
Sathyamoorthy

(10) Patent No.: US 12,456,743 B2
(45) Date of Patent: Oct. 28, 2025

(54) INTEGRATED WASTE REDUCTION SYSTEM

(71) Applicant: Black & Veatch Holding Company, Overland Park, KS (US)

(72) Inventor: Sandeep Sathyamoorthy, Walnut Creek, CA (US)

(73) Assignee: Black & Veatch Holding Company, Overland Park, KS (US)

( * ) Notice: Subject to any disclaimer, the term of this patent is extended or adjusted under 35 U.S.C. 154(b) by 497 days.

(21) Appl. No.: 18/069,674

(22) Filed: Dec. 21, 2022

(65) Prior Publication Data
US 2023/0207847 A1 Jun. 29, 2023

Related U.S. Application Data

(60) Provisional application No. 63/293,248, filed on Dec. 23, 2021.

(51) Int. Cl.
| | | |
|---|---|---|
| *H01M 8/06* | (2016.01) | |
| *C02F 11/02* | (2006.01) | |
| *C02F 103/20* | (2006.01) | |
| *C02F 103/32* | (2006.01) | |
| *C12M 1/00* | (2006.01) | |

(Continued)

(52) U.S. Cl.
CPC ............... *H01M 8/06* (2013.01); *C02F 11/02* (2013.01); *C12M 23/40* (2013.01); *C12M 23/58* (2013.01); *C12M 43/08* (2013.01); *H01M 8/004* (2013.01); *H01M 8/16* (2013.01); *C02F 2103/20* (2013.01);

(Continued)

(58) Field of Classification Search
CPC .......... H01M 8/06; H01M 8/16; H01M 8/004; C12M 43/08; C12M 23/58; C12M 23/40; C02F 11/02

See application file for complete search history.

(56) References Cited

U.S. PATENT DOCUMENTS

| | | |
|---|---|---|
| 7,491,453 B2 | 2/2009 | Logan et al. |
| 7,807,303 B2 | 10/2010 | Swift et al. |

(Continued)

FOREIGN PATENT DOCUMENTS

| | | |
|---|---|---|
| CN | 103337650 | 10/2013 |
| CN | 108840430 | 11/2018 |

(Continued)

OTHER PUBLICATIONS

Das, et al., "On-Site Sanitary Wastewater Treatment System Using 720-L Stacked Microbial Fuel Cell: Case Study", Journal of Hazardous, Toxic, and Radioactive Waste, 2020, 24(3), 2 pages (abstract attached).

(Continued)

*Primary Examiner* — Sarah A. Slifka
(74) *Attorney, Agent, or Firm* — Hovey Williams LLP

(57) ABSTRACT

A waste reduction system that utilizes organic solids suspended in a waste stream to produce carboxylic acids, which can then be employed as an input to a microbial fuel cell or other biological processes to further enhance biogas production, is provided. The organic waste stream influent undergoes a multistage fermentation process in which fermentative microorganism metabolize the organic waste materials and produce one or more carboxylic acids, especially short chain fatty acids. The carboxylic acids serve as a food source for bacteria within an anode compartment of an MFC that generates useable electricity therefrom.

24 Claims, 3 Drawing Sheets

(51) Int. Cl.
H01M 8/00 (2016.01)
H01M 8/16 (2006.01)

(52) U.S. Cl.
CPC ...... *C02F 2103/32* (2013.01); *C02F 2301/08* (2013.01)

(56) References Cited

U.S. PATENT DOCUMENTS

| | | | |
|---|---|---|---|
| 9,963,790 | B2 | 5/2018 | Silver et al. |
| 10,099,950 | B2 | 10/2018 | Silver et al. |
| D875,208 | S | 2/2020 | Babanova et al. |
| D899,561 | S | 10/2020 | Babanova et al. |
| D902,842 | S | 11/2020 | Babanova et al. |
| 10,836,662 | B2 | 11/2020 | Shechter |
| 10,978,713 | B2 | 4/2021 | Logan et al. |
| 2006/0147763 | A1 | 7/2006 | Angenent et al. |
| 2010/0178530 | A1 | 7/2010 | Min et al. |
| 2015/0104670 | A1 | 4/2015 | Logan |

FOREIGN PATENT DOCUMENTS

| | | |
|---|---|---|
| CN | 113694732 | 11/2021 |
| IN | 202041021896 | 6/2020 |
| JP | 2002018398 | 1/2002 |
| JP | 2006175406 | 7/2006 |
| KR | 100778155 | 11/2007 |
| KR | 101408302 | 6/2014 |
| WO | 2007006107 | 1/2007 |

OTHER PUBLICATIONS

Aelterman, et al., "Continuous Electricity Generation at High Voltages and Currents Using Stacked Microbial Fuel Cells", Environ. Sci. Technol., 2006, 40(10), pp. 3388-3394 (abstract attached).

Alsayed, et al., "Microbial fuel cells for municipal wastewater treatment: From technology fundamentals to full-scale development", Renewable and Sustainable Energy Reviews, 2020, 134, p. 110367 (abstract attached).

Rabaey, et al., "Microbial fuel cells: novel biotechnology for energy generation", Trends in Biotechnology, 2005, 23, pp. 291-298.

Logan, et al., "Microbial fuel cells: methodology and technology", Environ Sci Technol, 2006, 40(17), pp. 5181-5192 (abstract attached).

Mathuriya, et al., "Treatment of Brewery Wastewater and Production of Electricity through Microbial Fuel Cell Technology", Inter J Biotech and Biochem., 2010, 6(1), pp. 71-80.

International Search Report and Written Opinion in corresponding PCT/US2022/082159, dated Apr. 26, 2023.

INTEGRATED WASTE REDUCTION SYSTEM

CROSS-REFERENCE TO RELATED APPLICATION

This application claims the priority benefit of U.S. Provisional Patent Application No. 63/293,248, filed Dec. 23, 2021, which is incorporated by reference herein in its entirety.

BACKGROUND OF THE INVENTION

Field of the Invention

Certain embodiments of the present invention are directed toward an integrated waste reduction system comprising fermentation vessels configured to produce one or more carboxylic acids from waste organic material. The system can also be equipped with a microbial fuel cell configured to generate electricity using the one or more carboxylic acids from the fermentation vessels as a feedstock.

Description of the Prior Art

Remediation of sludge from waste streams is an important consideration for many industries, including agriculture, municipal waste handling, and food and beverage production. Generally, conventional processes rely upon treating the waste with bacteria which digest the organic materials contained therein, rendering them more biodegradable and more suitable for landfilling or composting. Often, anaerobic digesters produce byproducts such as methane and hydrogen, which can be recovered, and their energy content put to beneficial use.

Bioelectricity generation from waste streams, such as through use of a microbial fuel cell (MFC), is an evolving technology which has shown potential as a renewable energy source. In an MFC, anaerobic microorganisms oxidize organic material in an anode chamber to produce protons that migrate from the anode chamber to a cathode compartment through a proton exchange membrane. In the cathode compartment, an electron acceptor, commonly oxygen, is reduced through reaction with the protons thereby generating electrons that migrate via a conductive wire.

Presently, MFCs are capable of modest levels of power generation, and thus, MFCs have not been considered suitable for large scale adoption, such as on a municipal utility level. However, the electricity produced can find small scale use if it can be generated economically.

Alternatively microbial reactors can be used to produce hydrogen by applying a voltage between two electrodes. U.S. Pat. No. 7,491,453 describes such a reactor. The generated hydrogen gas can be collected and used, for example, as fuel for a hydrogen fuel cell.

There is a need in the art for a system that combines the benefits of waste reduction along with the ability to transform it to a more biodegradable form and to generate power that can be used to offset the energy demands of the waste reduction process or to utilize the more biodegradable form for higher biogas production in downstream processes.

SUMMARY OF THE INVENTION

According to one embodiment of the present invention there is provided a system for treating an organic waste feedstock. The system comprises first and second fermentation vessels. The first fermentation vessel comprises a waste stream inlet configured to direct the organic waste feedstock into the first fermentation vessel, an upflow tube having a lower tube inlet and an upper tube outlet, a liquid circulation device configured to cause the organic waste feedstock to enter the upflow tube at the lower tube inlet and exit the upflow tube at the upper tube outlet, a first fermentation vessel outlet, and one or more species of microorganisms that ferment an organic material contained within the organic waste feedstock and produce one or more carboxylic acids.

The second fermentation vessel comprises a second fermentation vessel inlet configured to receive an organic waste stream from the first fermentation vessel and introduce the organic waste stream into the second fermentation vessel, a second fermentation vessel outlet, and one or more species of microorganisms, which can be the same or different from the one or more species of microorganisms present within the first fermentation vessel, that ferment the organic material contained within the organic waste stream to produce one or more carboxylic acids, which can be the same or different from the one or more carboxylic acids produced within the first fermentation vessel.

According to another embodiment of the present invention there is provided a system for treating an organic waste feedstock. The system comprises a first fermentation vessel into which an organic waste feedstock is introduced and circulated therewithin, a second fermentation vessel into which an effluent from the first fermentation vessel is directed, and one or more microbial fuel cells configured to receive a liquid comprising the one or more carboxylic acids produced in the first and second fermentation vessels.

In one or more embodiments, the first fermentation vessel contains one or more species of microorganisms that ferment an organic material contained within the organic waste feedstock and produce one or more carboxylic acids. In one or more embodiments, the second fermentation vessel is operated under more quiescent conditions relative to the first fermentation vessel. The second fermentation vessel also comprises one or more species of microorganisms, which can be the same or different from the one or more species of microorganisms present within the first fermentation vessel, that ferment the organic material contained within the effluent from the first fermentation vessel to produce one or more carboxylic acids, which can be the same or different from the one or more carboxylic acids produced within the first fermentation vessel.

In one or more embodiments, the one or more microbial fuel cells comprise a cylindrical anode chamber comprising one or more anodes that are immersed within a first quantity of the liquid comprising the one or more carboxylic acids. The anode chamber comprises one or more microorganisms capable of hydrolyzing the one or more carboxylic acids and producing protons. The microbial fuel cell further comprises an annular cathode chamber located outboard of the anode chamber and comprising one or more cathodes. The one or more cathodes are immersed in a second quantity of the liquid comprising the one or more carboxylic acids. The second quantity of the liquid further comprises an electron receptor, such as dissolved oxygen. Within the cathode chamber, protons produced in the anode chamber are reacted with the electron receptor to produce water. The microbial fuel cell also comprises a gas-permeable membrane separating the anode chamber from the cathode chamber. The gas-permeable membrane permits protons to pass between the anode chamber and the cathode chamber.

According to another embodiment of the present invention there is provided a fermentation vessel for fermenting organic material contained within an organic waste feedstock. The fermentation vessel comprises a waste stream inlet configured to direct the organic waste feedstock into the fermentation vessel. The vessel further comprises an upflow tube having a lower tube inlet and an upper tube outlet. The waste stream inlet introduces the organic waste feedstock directly into the upflow tube at a point in between the lower tube inlet and the upper tube outlet. The vessel comprises a liquid circulation device located within the upflow tube configured to cause the intake of a liquid fermentation media being circulated within the fermentation vessel through the lower tube inlet and expel the liquid fermentation media through the upper tube outlet. The vessel also comprises an upflow transition zone disposed laterally from the upflow tube configured to conduct the liquid fermentation media between a lower transition zone inlet toward an upper transition zone outlet. The vessel further comprises a waste stream outlet connected to the upflow transition zone and configured to direct the liquid fermentation media out of the fermentation vessel.

According to yet another embodiment of the present invention there is provided a fermentation vessel for fermenting organic material contained in a liquid waste stream. The vessel comprises a waste stream inlet, a waste distribution manifold, an agitating device, and a vertical duct. The waste stream inlet is configured to direct the liquid waste stream into the fermentation vessel. A feed tube extends from the waste stream inlet and has an opening communicating the feed tube with an interior of the fermentation vessel. The opening is located within the lower half of the second fermentation vessel. The agitating device is configured for intermittent operation to stir periodically a liquid fermentation media contained within the fermentation vessel. The liquid fermentation media comprises the liquid waste stream introduced into the fermentation vessel through the waste stream inlet. The vertical duct comprises a first passage extending between the bottom of the fermentation vessel and a vessel outlet located in the upper half of the fermentation vessel configured to direct a portion of the liquid fermentation media upward toward a vessel outlet.

According to still another embodiment of the present invention there is provided a microbial fuel cell configured to generate electricity from a liquid waste stream comprising one or more carboxylic acids. The microbial fuel cell comprises a cylindrical anode chamber comprising one or more anodes, an annular cathode chamber located outboard of the anode chamber and comprising one or more cathodes, and a gas permeable membrane separating the anode chamber from the cathode chamber. The one or more anodes present within the anode chamber are immersed within a first quantity of the liquid waste stream comprising the one or more carboxylic acids. The anode chamber further comprises one or more microorganisms capable of hydrolyzing the one or more carboxylic acids and produce protons. The one or more cathodes are immersed in a second quantity of the liquid waste comprising the one or more carboxylic acids. The cathode chamber comprises one or more diffusers configured to introduce an electron receptor, such as oxygen, into the second quantity of the liquid waste. Within the cathode chamber, protons produced in the anode chamber are reacted with the electron receptor to produce water. The gas-permeable membrane permits protons to pass between the anode chamber and the cathode chamber.

Figure 1:
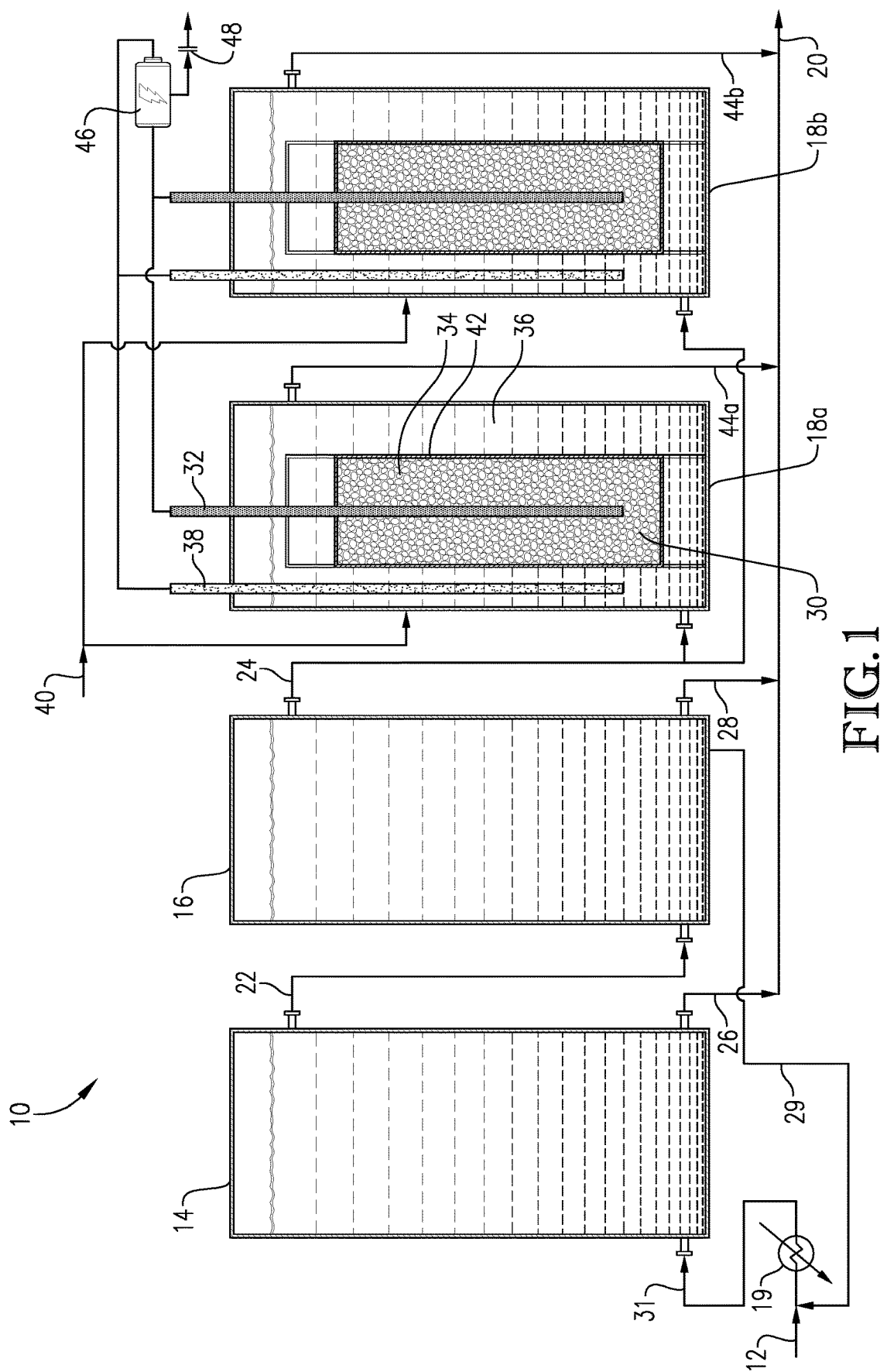
FIG. 1 is a schematic depiction of one embodiment of an integrated waste reduction system according to the present invention.

While the drawings do not necessarily provide exact dimensions or tolerances for the illustrated components or structures, the drawings are to scale with respect to the relationships between the components of the structures illustrated in the drawings.

DETAILED DESCRIPTION OF THE PREFERRED EMBODIMENT

FIG. 1 depicts an embodiment of an integrated waste reduction system 10. In system 10, a waste feedstock 12 is introduced into a series of fermentation vessels 14, 16 in which organic waste solids contained within the waste feedstock 12 are fermented by one or more microorganisms to produce one or more carboxylic acids. In one embodiment, system 10 can comprise only fermentation vessels 14, 16, if solids reduction in the waste feedstock or enhancement of an anaerobic digester is the primary interest. However, in alternate embodiments, system 10 can further comprise one or more microbial fuel cells (MFCs) 18 that are configured to generate electricity using the effluent from fermentation vessel 16, and in particular the one or more carboxylic acids contained therein.

In one or more embodiments, the influent organic waste feedstock 12 comprises suspended and/or dissolved organic material within an aqueous stream. In certain embodiments, the waste feedstock 12 comprises a solids concentration of from about 0.1% to about 10% by weight, or from about 0.5% to about 5% by weight, or from about 1% to about 2.5% by weight. In certain embodiments, the organic waste feedstock 12 comprises a chemical oxygen demand (COD) concentration of from about 3,000 to about 50,000 mg/L, from about 15,000 to about 40,000 mg/L, or from about 20,000 to about 30,000 mg/L. In certain embodiments, the waste feedstock 12 has a pH of from about 6 to about 8.5, from about 6.5 to about 8.0, or from about 7.0 to about 7.5, although the feedstock pH can be adjusted through the addition of acids or bases to provide an environment that is favorable to the fermentative microorganisms. Likewise, the organic waste feedstock can have a temperature approximating an ambient temperature, preferably between about 20° to about 30° C. However, if the feedstock has a temperature below about 20° C., the feedstock may need to be heated prior to being delivered to the first fermentation vessel 14 to achieve the desired temperature.

In one or more embodiments, at least a portion of the feedstock 12 and at least a portion of any recirculated liquid waste stream 29 from fermentation vessel 16, described in greater detail below, can be combined upstream of a heater 19 to form a combined stream 31 that is fed to the inlet of the first fermentation vessel 14. Heater 19 is located upstream from the first fermentation vessel 14 and downstream from the point at which portions of feedstock 12 and recirculated waste stream 29 are combined and can be any piece of equipment configured to supply heat to the stream 31, such as an electrical or gas-powered heater or a shell and tube heat exchanger. Under certain conditions, stream 29 may have a greater temperature than feedstock stream 12, and by combining the contents of streams 12 and 29 upstream of heater 19, the energy requirements of heater 19 to achieve a particular temperature for the combined stream 31 can be reduced. However, in alternate embodiments, feedstock stream 12 can be heated prior to being combined with the recirculated liquid waste stream 29 so that the combined stream 31 need not undergo further heating.

In one or more embodiments, the influent organic feedstock comprises (i) wastewater derived solids (e.g., primary sludge, waste activated sludge, waste mixed liquor, return activated sludge), (ii) agricultural waste feedstocks (e.g., dairy cow manure, swine manure, poultry manure), and/or (iii) food-waste slurries (e.g., from food and beverage manufacturing facilities). However, other organic material-containing feedstocks may also be used with the present invention. In certain embodiments configured for operation to reduce the mass of solids in feedstock 12, processes according to the present invention result in approximately a 30% to 50% reduction in the mass of solids present in feedstock 12. The remaining solids, which exit system 10 as a product stream 20, can be disposed of or undergo additional solids reduction treatment if necessary. However, unlike conventional processes, embodiments of the present invention can also render these product solids more biodegradable. In certain embodiments configured to enhance downstream anaerobic digestion operations (e.g., associated with biomethane production) supplied with waste from the first and or second fermentation vessel, processes according to the present invention can increase the biodegradability of remaining solids by 10% to 50%, as determined by the conversion of the organic content of the feedstock 12 to short-chain fatty acids. Alternatively, a downstream biomethane potential test, in an anaerobic system, or an oxygen uptake test, in a downstream aerobic system, can be used to determine the increase in biodegradability of the remaining solids.

The effluent from second fermentation vessel 16 comprises one or more carboxylic acids that were produced from the fermentative microorganisms present within fermentation vessels 14 and 16. In embodiments of system 10 that comprise one or more MFCs 18, the fermentative microorganisms preferably comprise species of bacteria that are capable of producing one or more carboxylic acids that will be used as food for bacteria species present in the anode chamber of the MFC 18. In one or more embodiments, the bacteria present within the anode chamber of the MFC 18 can include proteobacteria, such as *Geobacter*, and *Shewanella*, which are capable of hydrolyzing the carboxylic acids and producing protons.

In one or more embodiments, the one or more carboxylic acids produced in the first and second fermentation vessels 14, 16 are short chain fatty acids (SCFAs) selected from the group consisting of formic acid, acetic acid, propionic acid, isobutyric acid, butyric acid, isovaleric acid, valeric acid, isocaproic acid, caproic acid, and heptanoic acid. In preferred embodiments, the effluent from the second fermentative vessel 16 comprises a mixture of a plurality of SCFAs as set forth in Table 1, below. All weight percentages expressed are based upon the total acid content present within the effluent of the second fermentation vessel 16.

TABLE 1

| Acid | Broad range (wt. %) | Intermediate range (wt. %) | Narrow range (wt. %) |
|---|---|---|---|
| Formic acid | 2-40% | 5-30% | 10-20% |
| Acetic acid | 15-80% | 25-70% | 35-60% |
| Propionic acid | 5-35% | 10-30% | 15-25% |
| Isobutyric acid | <10% | <7.5% | <5% |
| Valeric acid | <5% | <2.5% | <0.5% |
| Isocaproic acid | <5% | <2.5% | <0.5% |
| Caproic acid | <5% | <2.5% | <0.5% |
| Heptanoic acid | <5% | <2.5% | <0.5% |

As shown in FIG. 1, the effluent 22 from first fermentation vessel 14 is the influent to the second fermentation vessel 16. Likewise, the effluent 24 from the second fermentation vessel 16 is the influent to the one or more MFCs 18a, 18b. Sludge or other solid organic materials not consumed in the fermentation vessels can be periodically removed from the vessels 14, 16 as waste streams 26, 28. These waste streams can be combined to form overall product stream 20.

As depicted in FIG. 1, system 10 may comprise a plurality of MFCs 18a, 18b arranged in parallel with respect to receiving effluent from the second fermentation vessel 16. In preferred embodiments, system 10 comprises at least two, at least three, or at least four MFCs 18 for the pair of first and second fermentation vessels 14, 16. Each MFC 18 comprises an anode chamber 30 in which are located one or more anodes 32. Anode chamber 30 may also include a quantity of a granular graphite-containing material 34 that surrounds the one or more anodes 32. The bacteria present within anode chamber 30 are preferably in the form of a biofilm located on the surface of the one or more anodes 32 and/or the granular material 34.

The MFC 18 also comprises a cathode chamber 36 in which are located one or more cathodes 38. An electron receptor such as air 40, or other oxygen-containing gas, is introduced into the MFC 18, and in particular cathode chamber 36. Alternatively, a nitrate (and/or nitrite) rich liquid stream can be used in place of the oxygen-containing gas as the electron receptor. The nitrate rich-liquid liquid stream can comprise a secondary effluent stream from a wastewater treatment facility resulting from a nitrification or nitritation or nitration treatment process. The anode chamber 30 and cathode chamber 36 are separated by a gas-permeable membrane 42, also referred to as a proton exchange membrane (PEM), which permits protons generated within anode chamber 30 to migrate toward the one or more cathodes 38. Nafion® is an exemplary PEM that may be used with the present invention. Effluent 44a, 44b can be withdrawn from each MFC 18a, 18b and combined with the waste from the fermenters as a part of product stream 20.

The anodes 32 and cathodes 38 are preferably formed from a modified graphite material. However, the cathodes 38 may optionally be treated or doped with a catalyst to enhance the water-production reaction occurring within the cathode chamber 36. An electrical current is generated and flows between the anodes 32 and cathodes 38 of the MFC. A supercapacitor or other energy storage device 46 can be positioned within the circuit in order to store the electrons generated in the MFC, until the electrons are needed to provide power to an electrical load 48. Preferably, the electrical load 48 comprises one or more pieces of equipment, such as pumps, heaters, and mixers, that are used in other areas of system 10 to reduce the energy costs associated with system operation. In one or more embodiments, system 10 can be operated as substantially energy neutral, requiring little to no external energy input.

Figure 2:
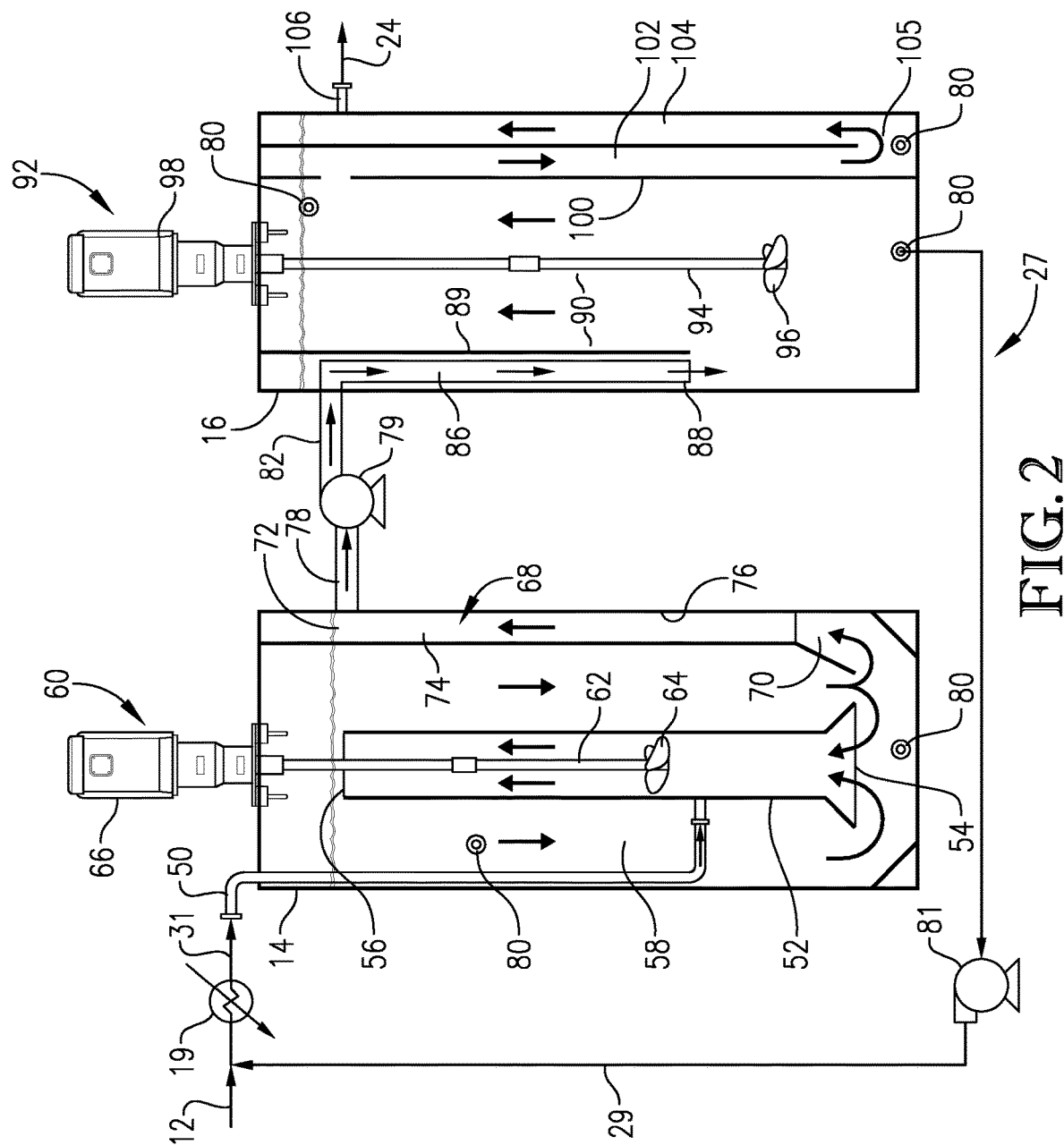
FIG. 2 is a schematic depiction of embodiments of first and second fermentation vessels configured to generate one or more carboxylic acids through fermentation of organic waste material.

Turning to FIG. 2, embodiments of the first and second fermentation vessels 14, 16 are depicted in greater detail. According to one embodiment, the first fermentation vessel 14 comprises a waste stream inlet 50 configured to direct the organic waste feedstock 12 into the fermentation vessel, and an upflow tube 52 having a lower tube inlet 54 and an upper tube outlet 56. In one particular embodiment, the tube inlet 54 has a conical or bell shape, which has a diameter that is larger than the diameter of the rest of the upflow tube 52. However, any inlet configuration can be used, but it is preferable for the area of the inlet 54 to be greater than the cross-sectional area of the rest of the upflow tube 52.

In one or more embodiments, the waste stream inlet 50 is connected to the upflow tube 52 to deliver the organic waste feedstock directly into the upflow tube at a point in between the tube inlet 54 and the tube outlet 56. However, this need not always be the case and waste stream inlet 50 can simply direct the organic waste feedstock 12 into the main vessel chamber 58. In particular embodiments, the waste stream inlet 50 introduces the organic waste feedstock 12 into the upflow tube 52 at a location that is closer to the tube inlet 54 than the tube outlet 56. In certain embodiments, the flow rate of the organic waste feedstock into the first fermentation vessel is at least 15,000 gpd, at least 20,000 gpd, or at least 30,000 gpd. In an exemplary embodiment, the flow rate of organic waste feedstock into the first fermentation vessel is from 14,400 to 187,200 gpd. However, the flow rate that the vessel 14 can accommodate can be scaled along with the overall vessel volume.

The first fermentation vessel 14 further comprises a liquid circulation device 60. As illustrated, device 60 comprises a shaft 62 having an agitator or impeller 64 attached to a distal end thereof. The proximal end of shaft 62 is attached to an electric motor 66 that is located outside of vessel 14. It is noted that other types of mixing or agitation devices, for example a pump, can be used in order to provide for circulation of the liquid and suspended organic solids within vessel 14. In certain embodiments, the liquid circulation device 60, or at least a portion thereof such as agitator 64, is located within upflow tube 52 and configured to cause the intake of a liquid fermentation media being circulated within the fermentation vessel 14 through the lower tube inlet 54 and expel the liquid fermentation media through the upper tube outlet 56. The liquid fermentation media is made up of the organic waste feedstock 12, the one or more species of fermentative microorganisms, and the resulting fermentation products, which as noted above include one or more carboxylic acids.

The first fermentation vessel 14 further includes an upflow transition zone 68 that is disposed laterally from the upflow tube 52 and configured to conduct the liquid fermentation media present within the vessel between a lower transition zone inlet 70 and an upper transition zone outlet 72. The upper transition zone outlet 72 is preferably located in the upper half of the vessel 14. In certain embodiments, the inlet 70 is positioned at a lower elevation with vessel 14 than the inlet 54 to upflow tube 52. In one or more embodiments, the upflow transition zone 68 comprises a vertical plenum 74 that is defined at least in part by an inner surface 76 of an outer wall of the vessel 14. It is noted that other configurations for transition zone 68 are possible and can include a vertically oriented pipe or conduit that presents a passage through which the liquid fermentation media can flow. In certain embodiments, the upflow transition zone 68 is configured to provide a fluid linear velocity for the fermentation media of from about 0.1 to about 3 m/h, from about 0.25 to about 2 m/h, or from about 0.4 to about 1.5 m/hr.

The first fermentation vessel 14 also includes a waste stream outlet 78 that is connected to the upflow transition zone 68 and configured to direct the liquid fermentation media out of the fermentation vessel 14. Vessel 14 can also be equipped with wasting valves 80 to permit sludge or portions of the liquid fermentation media to be removed from the vessel periodically.

The second fermentation vessel 16 comprises a waste stream inlet 82 that can be coupled to the waste stream outlet 78 of the first fermentation vessel 14 via a conduit section 84. Note, first and second fermentation vessels 14, 16 can be immediately joined together from outlet 78 to inlet 82. However, it is within the scope of the present invention for there to be an intermediate holding vessel (not shown) interposed between the two to act as a buffer between the two vessels. In addition, the effluent from first fermentation vessel 14 may be transferred to fermentation vessel 16 by gravity, i.e., creating a head pressure resulting from a difference in elevation between outlet 78 and inlet 82. However, in certain embodiments, a conveyance method, such as a pump 79 may be needed to facilitate this transfer.

The waste stream inlet 82 is configured to direct the effluent from the first fermentation vessel 14 (still a liquid waste stream) into the second fermentation vessel 16. In one or more embodiments, the waste stream inlet 82 is located within the upper half of the second fermentation vessel 16 and is connected to a downwardly extending feed tube 86 having an opening 88 communicating the feed tube with the main chamber 90 of vessel 16. It is preferable that opening 88 be located in the lower half, and more preferably in the lower one-third, of vessel 16. Configuring opening 88 in this manner prevents the flow of effluent from exiting vessel 16 too quickly when the vessel is being operated in a continuous mode. A baffle 89 may also be used to mitigate or prevent any such "short circuiting" of the fluid flow within vessel 16. However, in vessels configured for batch operation, baffle 89 need not be provided. In certain embodiments, opening 88 should be sufficiently spaced form the bottom of vessel 16 to permit the incoming effluent to become sufficiently distributed within the lower half of the vessel and not be immediately redirected upwardly into the upper half of the vessel.

The second fermentation vessel 16 further comprises an agitating device 92 that is configured for intermittent operation to stir periodically the liquid fermentation media contained within the fermentation vessel. The liquid fermentation media present within vessel 16 comprises the liquid waste stream (the effluent from fermentation vessel 14), one or more species of fermentative microorganisms, and the carboxylic acid fermentation products. Unlike the first fermentation vessel 14, vessel 16 is intended to be operated more quiescently. Namely, agitating device 92 is operated occasionally only to resuspend organic material that has settled to the vessel floor and not to provide continuous recirculation of the liquid fermentation media within the vessel.

Agitating device 92 can be configured similarly to circulation device 60 from fermentation vessel 14. In particular, device 92 may comprise a shaft 94, an impeller 96, and an electric motor 98. Alternatively, any other type of agitating device configured to resuspend settled solid materials can be employed.

The second fermentation vessel 16 further comprises a vertical duct 100 comprising a first passage 102 configured to intake a portion of the liquid fermentation media from a location in the upper half of the fermentation vessel 16 and direct it downward toward the bottom of the fermentation vessel (i.e., into the lower half of the vessel), and a second passage 104 connected to the first passage 102 and configured to direct the portion of the liquid fermentation media upward toward a vessel outlet 106. In one or more embodiments, the vertical duct 100 is disposed laterally from the main chamber 90 of the vessel. The duct 100 defines a downflow/upflow transition zone that is configured to achieve a target downflow and upflow velocity. An effluent 24 comprising the one or more carboxylic acids produced during fermentation within vessels 14, 16 is withdrawn through vessel outlet 106. Effluent 24 can then be directed toward the one or more microbial fuel cells 18 as described herein.

As with the first fermentation vessel 14, the second fermentation vessel 16 may further comprise a plurality of wasting valves 80 located within the main chamber 90 and the vertical duct 100. The wasting valves 80 are operable to permit sludge and/or fermentation media removal as desired. One wasting valve 80 can be positioned in a segment 105 that interconnects passages 102 and 104 so as to facilitate removal of settled sludge from duct 100.

It is possible to operate the first and second fermentation vessels 14, 16 in either continuous mode in which feedstock 12 is continuously being fed and 24 from second fermentation vessel 16 continuously produced, or in a batch mode. In the batch mode of operation, each fermentation vessel is charged and permitted to operate for a predetermined period of time. During batch operation, recirculation fluid in stream 29 may be directed to the first fermentation vessel 14 and effluent 22 from the first fermentation vessel may be fed to the second fermentation vessel 16. After the desired operation time has expired, effluent 23 can be withdrawn from the second fermentation vessel 16 and new feedstock 12 directed into the first fermentation vessel 14. Further, if the second fermentation vessel is configured for batch operation only, passage 102 is optional, and effluent need only flow upwardly through passage 104 when emptying vessel 16.

In one or more embodiments, a recirculation system 27 is provided that is configured to withdraw a quantity of liquid waste located within the second fermentation vessel 16, through one of valves 80 for example, and recirculate the waste to the first fermentation vessel 14 through conduit 29. A recirculation conveyance method, such as pump 81, can be used to recirculate the contents from the second fermenter vessel 16 to the first fermentation vessel 14. Recirculating the liquid waste from vessel 16 to vessel 14 permits solids and biologicals to be recycled through the system a plurality of times in order to achieve greater fermentation efficiency for the system. In certain embodiments, the recirculation flow comprises 50 to 500 vol. %, 100 to 450 vol. %, or 150 to 400 vol. % of the organic waste feedstock 12 being fed to the system.

In one or more embodiments, the first and second fermentation vessels 14, 16 are configured so that the hydraulic residence time of each vessel is approximately the same (i.e., the vessels have the same or similar volumes). However, the solids retention time within each vessel can be quite different. In one particular embodiment, the second fermentation vessel 16 has a solids retention time that is approximately 3-5 times greater than the solids retention time of the first fermentation vessel 14.

System 10, comprising fermentation vessels 14, 16, is particularly suited for use in agricultural applications, especially manure treatment. In such applications, the input feedstock 12 comprises a slurry including animal manure. The fermentation process carried out in vessels 14, 16 can produce a manure sludge (via wasting valves 80) that comprises a degraded manure output product that has a higher biomethane potential (as compared to the input feedstock). Thus, the manure output product is more biodegradable and more amenable to biogas production through subsequent anaerobic digestion processes. In one or more embodiments, the effluent 24 from fermentation vessel 16 can be combined with the sludge for subsequent processing steps. Alternatively, the effluent 24, which is enriched in short-chain fatty acids, can be maintained as a separate product stream and directed toward an MFC 18. Further still, effluent 24 can be recovered and processed to take advantage of this high short-chain fatty acid content in other ways. For example, effluent 24, which is low in solids, can be recovered and used for a range of opportunities; for example, pasteurized to create antimicrobial or other products.

Figure 3:
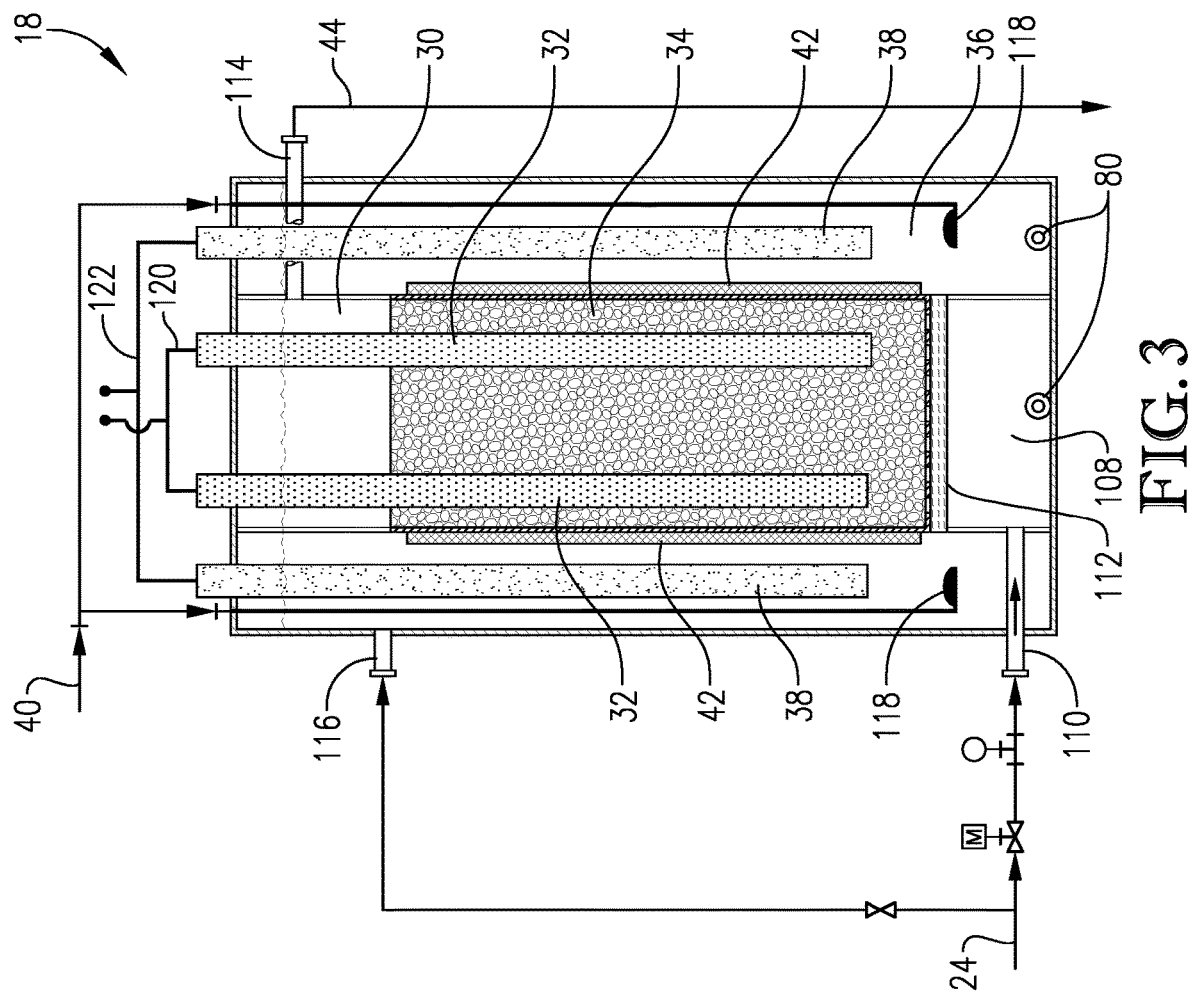
FIG. 3 is a schematic depiction of one embodiment of a microbial fuel cell according to the present invention for generating electricity through the hydrolysis of one or more carboxylic acids produced in the fermentation vessels.

FIG. 3 depicts a microbial fuel cell 18 according to one embodiment of the present invention. As noted above, a single installation of system 10 can comprise multiple MFCs 18 arranged in parallel in order to accommodate the waste processing requirements for the system. In certain embodiments, system 10 comprises four MFCs 18. The MFC 18 is configured to generate electricity from a liquid waste stream containing one or more carboxylic acids, e.g., the effluent 24 from the second fermentation vessel 16.

In one or more embodiments, the MFC 18 comprises a cylindrical anode chamber 30 that comprises one or more anodes 32 that are immersed within a first quantity of the liquid waste stream 24 comprising the one or more carboxylic acids. Also located within the anode chamber 30 is a quantity of graphite-containing granules 34 surrounding and in contact with the one or more anodes 32. The graphite granules 34 may be commercially obtained but undergo a modification process prior to forming the granule bed within the anode chamber 30. The modification process could involve heating the granules to a temperature of approximately 800° C. for about 2 hours and then allowing the granules to cool in an ammonia stream. The modification process can be used to enhance the porosity and/or surface area of the granules. As noted above, the anode chamber comprises one or more species of microorganisms capable of hydrolyzing the one or more carboxylic acids present within the liquid waste stream 24 and producing protons. In certain embodiments, the cylindrical anode chamber 30 comprises a plurality of anodes 32 arranged in a radially symmetric pattern with a specific dimension to the center of the chamber. This arrangement of anodes may be circular, square, or take on any polygon shape.

The MFC 18 further comprises an influent plenum 108 that is configured to receive the liquid waste stream 24 entering the MFC through inlet 110, and then direct the liquid waste stream into the cylindrical anode chamber 30. Thus, in certain embodiments, plenum 108 is located directly beneath the anode chamber 30. In such embodiments, the liquid waste stream 24 can be dispersed from plenum 108 into the anode chamber 30 through a distributor plate 112. The distributor plate may comprise a solid plate with a plurality of orifices formed therein or a screen, for example, which maintains the granules 34 within the anode chamber 30 but permits the liquid waste stream 24 to enter and flow upwardly into the chamber.

As the liquid waste stream 24 moves upwardly through the cylindrical anode chamber 30, the one or more carboxylic acids are metabolized by the one or more species of microorganisms present therein, preferably in the form of a biofilm located on the surfaces of the one or more anodes 32 and/or granules 34. The microorganisms hydrolyze the carboxylic acids and, in the process, generate protons. The liquid waste stream, which is now depleted in carboxylic acids, continues to flow upwardly through the anode chamber 30 and exits via outlet 114 as an MFC effluent 44. Any waste or sludge accumulating within the inlet plenum 108 can occasionally be removed via a wasting valve 80. In one or more embodiments, each MFC 18 has a smaller overall volume than either of fermentation vessels 14, 16. Accordingly, in certain embodiments each WC 18 is configured to have a hydraulic residence time that is less than 75%, or less than 65%, or less than 55%, or about 50% that of fermentation vessels 14, 16.

MFC 18 further comprises an annular cathode chamber 36 that is located outboard of the anode chamber 30. Cathode chamber 36 comprises a ring-like cross-sectional configuration that surrounds the anode chamber 30. Cathode chamber 36 comprises one or more cathodes 38 that are immersed in a second quantity of the liquid waste stream 24. Note, the second quantity of the liquid waste stream 24 that is present within cathode chamber 36 is stagnant insofar as it does not represent a continuous flow of the waste stream through the cathode chamber 36. Rather, the cathode chamber 36 is filled periodically with the second quantity of the liquid waste stream via an inlet 116. The second quantity of liquid waste stream 24 is remains within the cathode chamber until its pH necessitates the liquid being drained and the chamber 36 being refilled. In one or more embodiments, once the second quantity of the liquid waste stream reaches a pH of between 5 to 5.5, it will be drained via a wasting valve 80 and replaced.

Because the liquid waste stream 24 is generally oxygen starved and the reaction occurring within the cathode chamber 36 requires an electron receptor to be present, dissolved oxygen is added to the second quantity of liquid waste stream 24 within chamber 36 via one or more diffusers 118. As noted previously, a nitrate (and/or nitrite) rich liquid effluent stream can be substituted for the oxygen-containing gas. Diffusers 118 are connected to a source of oxygen-containing gas 40, such as air, although a gas of higher oxygen concentration can also be used. In certain embodiments, the target dissolved oxygen concentration within the second quantity of liquid waste stream 24 is from about 0.2 to about 0.5 mg/L.

The one or more cathodes 38 present within the cathode chamber 36 are evenly distributed around the cylindrical anode chamber. In one or more embodiments, the cathodes 38 are arranged in a radially symmetrical pattern with a specific dimension from the center of the MFC 18. This arrangement may be circular, square, or take on any polygon shape.

The anode chamber 30 and cathode chamber 36 are separated from each other by a gas permeable membrane 42. The membrane 42 is configured to permit protons to pass between the anode chamber 30 and the cathode chamber 36. But, in all other respects, the anode chamber 30 and the cathode chamber 36, and their respective contents, are kept separate. Within the cathode chamber 36, the protons produced in the anode chamber 30 are reacted with the dissolved oxygen to produce water. If a nitrate rich stream is used in place of dissolved oxygen, the nitrate reacts with the protons to produce nitrogen gas and water.

Both the anodes 32 and cathodes 38 are immersed a specified distance into their respective chambers 30, 36. In one or more embodiments, the electrodes are immersed to a depth of from about 40% to about 60% of the electrode's length. The anodes 32 and cathodes 36 are connected to each other with a high-quality electrical conductor 120, 122. The conductors can then be connected to any desired load, such as a supercapacitor, and the circuit between anodes 32 and cathodes 36 completed.

System 10 comprising the one or more MFCs 18, is particularly suited for industrial water resource recovery processes. In such processes, system 10 can be utilized to treat feedstock 12, which comprises a wastewater-derived waste sludge, to reduce the solids content of the sludge, produce sludge that is more biodegradable, and produce energy from the MFC 18 through the short-chain fatty acids produced in fermentation vessels 14, 16. Alternatively, system 10 can be used to generate more biodegradable sludge and an "internally engineered" biodegradable carbon source, such as the short-chain fatty acids, that can be used in further downstream bioprocesses instead of or in addition to MFC 18. Still further, system 10 can be used to enhance the biodegradability of a waste stream prior to anaerobic digestion. For example, system 10 can be placed upstream of an anerobic digester that is configured to receive not only product stream 20, but a further waste stream such as a food waste stream. System 10 can be operated to increase the capacity of the anaerobic digester so that the additional waste stream can be better accommodated. Thus, system 10 can be used to improve the performance of the downstream digester.

I claim:

1. A system for treating an organic waste feedstock comprising:
   (a) a first fermentation vessel comprising:
      a waste stream inlet configured to direct the organic waste feedstock into the first fermentation vessel,
      an upflow tube having a lower tube inlet and an upper tube outlet,
      a liquid circulation device configured to cause the organic waste feedstock to enter the upflow tube at the lower tube inlet and exit the upflow tube at the upper tube outlet,
      a first fermentation vessel outlet; and
      one or more species of microorganisms that ferment an organic material contained within the organic waste feedstock and produce one or more carboxylic acids; and
   (b) a second fermentation vessel comprising:
      a second fermentation vessel inlet configured to receive an organic waste stream from the first fermentation vessel and introduce the organic waste stream into the second fermentation vessel,
      a second fermentation vessel outlet; and
      one or more species of microorganisms, which can be the same or different from the one or more species of microorganisms present within the first fermentation vessel, that ferment the organic material contained within the organic waste stream to produce one or more carboxylic acids, which can be the same or different from the one or more carboxylic acids produced within the first fermentation vessel.

2. The system of claim 1, wherein the first fermentation vessel outlet is located within the upper half of the first fermentation vessel.

3. The system of claim 1, wherein the first fermentation vessel further comprises a vertical plenum that is laterally disposed from the upflow tube and has a lower plenum inlet and an upper plenum outlet that is connected to the first fermentation vessel outlet.

4. The system of claim 1, wherein the second fermentation vessel comprises a transition zone in which the organic waste enters through a zone inlet located in the upper half of the second fermentation vessel, flows downwardly through a first passage, and then flows upwardly through a second passage before exiting the second fermentation vessel through the second fermentation vessel outlet, and wherein the transition zone comprises a sludge wasting valve located in segment of the transition zone interconnecting the first and second passages.

5. The system of claim 1, wherein each of the first and second fermentation vessels comprises at least one sludge wasting valve operable to remove sludge that has accumulated within each respective fermentation vessel.

6. The system of claim 1, wherein the one or more carboxylic acids produced in the first and/or second fermentation vessels comprise one or more short chain fatty acids selected from the group consisting of formic acid, acetic acid, propionic acid, isobutyric acid, butyric acid, isovaleric acid, valeric acid, isocaproic acid, caproic acid, and heptanoic acid.

7. The system of claim 1, wherein the organic waste feedstock comprises wastewater derived solids, agricultural waste solids, and/or food-waste solids.

8. The system of claim 1, the system further comprising a recirculation system configured to recirculate at least a portion of the organic waste stream from within the second fermentation vessel into the first fermentation vessel.

9. The system of claim 1, the system comprising an organic waste stream heater located upstream from the first fermentation vessel and downstream from a point where at least a portion of the recirculated organic waste stream is mixed with at least a portion of the organic waste feedstock.

10. The system of claim 1, wherein the second fermentation vessel comprises a feed tube extending from the second fermentation vessel inlet located in an upper half of the second fermentation vessel and having an opening communicating the feed tube with an interior of the second fermentation vessel, the opening being located within the lower half of the second fermentation vessel.

11. The system of claim 1, further comprising:
(c) one or more microbial fuel cells configured to receive a liquid comprising the one or more carboxylic acids produced in the first and second fermentation vessels, the one or more microbial fuel cells comprising:
(i) a cylindrical anode chamber comprising one or more anodes that are immersed within a first quantity of the liquid comprising the one or more carboxylic acids, the anode chamber comprising one or more microorganisms capable of hydrolyzing the one or more carboxylic acids and producing protons;
(ii) an annular cathode chamber located outboard of the anode chamber and comprising one or more cathodes, the one or more cathodes being immersed in a second quantity of the liquid comprising the one or more carboxylic acids, and further comprising a dissolved electron receptor, wherein within the cathode chamber protons produced in the anode chamber are reacted with the dissolved electron receptor to produce water; and
(iii) a gas-permeable membrane separating the anode chamber from the cathode chamber, the gas-permeable membrane permitting protons to pass between the anode chamber and the cathode chamber.

12. The system of claim 11, wherein the cylindrical anode chamber comprising a quantity of graphite-containing granules in contact with the one or more anodes, and wherein the annular cathode chamber comprises one or more diffusers operable to introduce the dissolved electron receptor into the cathode chamber.

13. The system of claim 11, wherein the cylindrical anode chamber comprises a plurality of the anodes arranged in a radially symmetric pattern therein, and wherein the annular cathode chamber comprises a plurality of the cathodes evenly distributed around the cylindrical anode chamber.

14. The system of claim 11, wherein the cylindrical anode chamber is configured to receive the first quantity of the liquid at a location beneath the one or more anodes and cause the first quantity of the liquid to flow upwardly through the cylindrical anode chamber toward a microbial fuel cell effluent outlet located in the upper half of the microbial fuel cell, and wherein the first quantity of the liquid is introduced into the cylindrical anode chamber through an inlet plenum located beneath the cylindrical anode chamber.

15. A fermentation vessel for fermenting organic material contained within an organic waste feedstock comprising:
a waste stream inlet configured to direct the organic waste feedstock into the fermentation vessel;
an upflow tube having a lower tube inlet and an upper tube outlet, the waste stream inlet introducing the organic waste feedstock directly into the upflow tube at a point in between the lower tube inlet and the upper tube outlet;
a liquid circulation device located within the upflow tube configured to cause the intake of a liquid fermentation media being circulated within the fermentation vessel through the lower tube inlet and expel the liquid fermentation media through the upper tube outlet;
an upflow transition zone disposed laterally from the upflow tube configured to conduct the liquid fermentation media between a lower transition zone inlet toward an upper transition zone outlet; and
a waste stream outlet connected to the upflow transition zone and configured to direct the liquid fermentation media out of the fermentation vessel.

16. The fermentation vessel of claim 15, wherein the liquid fermentation media comprises one or more species of microorganisms that ferment the organic material contained within the organic waste feedstock and produce one or more carboxylic acids.

17. The fermentation vessel of claim 15, wherein the upflow transition zone comprises a vertical plenum that is defined at least in part by an inner surface of an outer wall of the fermentation vessel.

18. The fermentation vessel of claim 15, wherein the liquid circulation device comprises an agitator attached to an elongate shaft, at least a portion of which is positioned inside the upflow tube.

19. The fermentation vessel of claim 15, wherein the upflow transition zone is configured to provide a fluid linear velocity for the fermentation media of from about 0.1 to about 3 m/h.

20. A fermentation vessel for fermenting organic material contained in a liquid waste stream comprising:
a waste stream inlet located in an upper half of the fermentation vessel and configured to direct the liquid waste stream into the fermentation vessel;
a feed tube extending from the waste stream inlet and having an opening communicating the feed tube with an interior of the fermentation vessel, the opening being located within the lower half of the second fermentation vessel;

an agitating device located within the interior of the fermentation vessel and configured for continuous or intermittent operation to stir a liquid fermentation media contained within the fermentation vessel, the liquid fermentation media comprising the liquid waste stream introduced into the fermentation vessel through the waste stream inlet; and a vertical duct comprising a first passage extending between the bottom of the fermentation vessel and a vessel outlet located in the upper half of the fermentation vessel configured to direct a portion of the liquid fermentation media upward toward a vessel outlet.

21. The fermentation vessel of claim 20, wherein the vertical duct comprises a second passage configured to intake a portion of the liquid fermentation media from a location in the upper half of the fermentation vessel and direct it downward toward the bottom of the fermentation vessel and into the first passage.

22. The fermentation vessel of claim 21, wherein the vertical duct comprises a sludge wasting valve located in a segment that interconnects the first and second passages.

23. The fermentation vessel of claim 20, wherein the feed tube opening and agitating device are located within a vessel main chamber, the vertical duct being disposed laterally from the main chamber.

24. The fermentation vessel of claim 23, wherein the main chamber comprises a sludge wasting valve that is operable to remove sludge that has accumulated within the main chamber.

\* \* \* \* \*